United States Patent [19]
Niki

[11] Patent Number: 5,754,689
[45] Date of Patent: May 19, 1998

[54] IMAGE PROCESSING METHOD AND APPARATUS

[75] Inventor: Tohru Niki, Yokohama, Japan

[73] Assignee: Canon Kabushiki Kaisha, Tokyo, Japan

[21] Appl. No.: 250,941

[22] Filed: May 31, 1994

Related U.S. Application Data

[63] Continuation of Ser. No. 748,951, Aug. 23, 1991, abandoned.

[30] Foreign Application Priority Data

Aug. 28, 1990 [JP] Japan ................................. 2-224344

[51] Int. Cl.$^6$ .................................................. G06K 9/48
[52] U.S. Cl. .................................. 382/198; 382/201
[58] Field of Search ........................... 382/16, 20, 21, 382/22, 25, 26, 23, 190, 191, 197, 198, 199, 201, 200, 204, 196

[56] References Cited

U.S. PATENT DOCUMENTS

| | | | |
|---|---|---|---|
| 4,163,214 | 7/1979 | Komori et al. | 382/56 |
| 4,644,583 | 2/1987 | Watanabe et al. | 382/22 |
| 4,817,172 | 3/1989 | Cho | 382/198 |

OTHER PUBLICATIONS

Experiments with "Characteristic Loci" for Recognition of Handprinted Characters, Knoll, IEEE Trans. on Comp. Apr. 69, pp. 366–372.

Glucksman, "Multicategory Classification of Patterns Represented by High Order Vectors of Multilevel Measurements", IEEE Tras. on Comp. Dec. 1971 pp. 1593–1598.

Tsuji, *OCR for Data Terminal*, Japan Telecommunication Review, vol. 21, No. 3, Jul. 1979, at 268–274.

Yoshida, *The Recognition of Handpainted Characters Including "Katakana"*, Alphabets, and Numerals, Proc. of the Int. Joint Conf. on Pattern Recognition, Nov. 8, 1979, at 645–649.

*Primary Examiner*—Yon Couso
*Attorney, Agent, or Firm*—Fitzpatrick, Cella, Harper & Scinto

[57] ABSTRACT

There is provided an image processing method whereby a slope at a first position on an outline of character data in input image data is extracted and phase data at a second position on a background of the character data is also extracted. The second position exists in the normal direction of the slope at the first position and is away from the first position by a predetermined distance. The phase data is based on states of black pixels in a plurality of predetermined directions at a target point. The predetermined distance depends on the size of character data.

30 Claims, 6 Drawing Sheets

| | SLOPE | PHASE |
|---|---|---|
| A | ↑ | ⊏ |
| B | ↘ | ⌟ |

| | 1 | 2 | 3 | 4 | 5 | 6 | 7 | 8 |
|---|---|---|---|---|---|---|---|---|
| COMPLEMENTAL POINT A' | — | L | ⌐ | — | ⊏ | ⊐ | ⊔ | □ |
| COMPLEMENTAL POINT B' | ⌈ | ⌊ | ⊓ | □ | | | | |

5,754,689

IMAGE PROCESSING METHOD AND APPARATUS

This application is a continuation of application Ser. No. 07/748,951 filed Aug. 23, 1991, now abandonded.

BACKGROUND OF THE INVENTION

1. Field of the Invention

The invention relates to image processing method and apparatus and, more particularly, to image processing method and apparatus for extracting a feature of a character from input image data.

2. Related Background Art

Hitherto, as a character recognizing method, there has been proposed a character recognizing method whereby in a binary image in which a character line (character pattern) is expressed by black pixels and a background is expressed by white pixels, phase data in the white pixels existing in a character pattern area and character line data in the black pixels are used as features.

According to the above method, a phase of a white pixel is determined in dependence on whether the scanning line collides with a character line or not when a predetermined direction is seen from the white pixel, and a code corresponding to the white pixel is given. For the black pixel, determination is made with regard to whether the black pixel exists in the character line or in the outline portion of the character line, and in the case where the black pixel is in the outline portion, further, its slope is also included and codes corresponding to the result of the discrimination and the slope are given. For the black pixel, phases of the white pixels which are respectively closest in the upper, lower, right, and left directions are further given as a high-order feature.

Hitherto, as a character recognizing method, there is a method whereby the character image is scanned from a certain side of a character area to an opposite side and a change point in the character portion and the background is detected, thereby obtaining a density of the background.

The conventional technique, however, has the following drawbacks.

Figure 6:
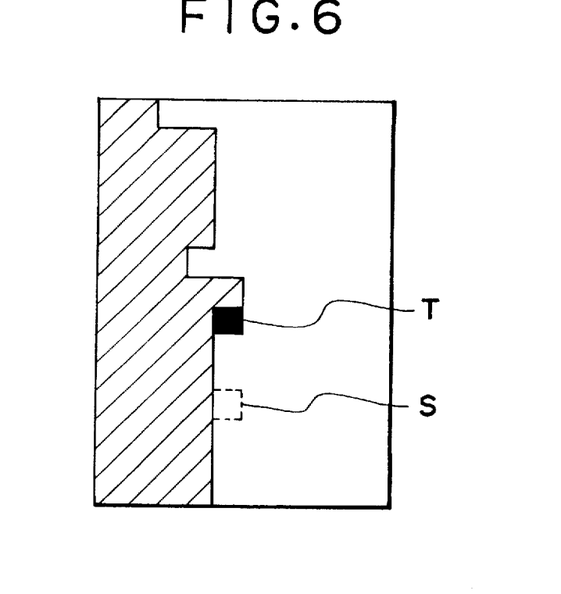

(i) For the white pixel closest to the black pixel, namely, the adjacent white pixel, its phase in the direction along the outline of a character is unstable and there is a fear such that a correct phase is not extracted. For instance, in FIG. 6 showing a part of a character image, when seen from a white pixel S, in spite of the fact that it should inherently be regarded that there is no character line in the upper direction, a T portion occurring due to slight concave and convex of the outline is detected as a character line.

(ii) If the phase of the white pixel adjacent to the black pixel is used, this results in that only a local portion near the black pixel is seen, and data included in the background of the character is not sufficiently extracted. Consequently, a frequency such that an error is generated in the character pattern recognition is high.

SUMMARY OF THE INVENTION

It is an object of the invention to eliminate the conventional drawbacks mentioned above and to provide image processing method and apparatus in which data included in a background of a character is stably extracted and a resultant feature is added to pixels of an outline portion, thereby enabling the feature to be stably extracted.

To accomplish the above object, according to the invention, there is provided an image processing apparatus for extracting a feature of an input character pattern, wherein as data for a target pixel obtained by an outline trace, a slope at the position of the target pixel and phase data at a background pixel point which is away from the target pixel by a predetermined distance in the direction of a normal line for the slope direction are extracted.

DETAILED DESCRIPTION OF THE PREFERRED EMBODIMENTS

An embodiment according to the invention will be described in detail hereinbelow with reference to the drawings.

A method of extracting a general character pattern feature to which a phase of a background is added will be first described with reference to FIGS. 5A and 5B.

Figure 5A:
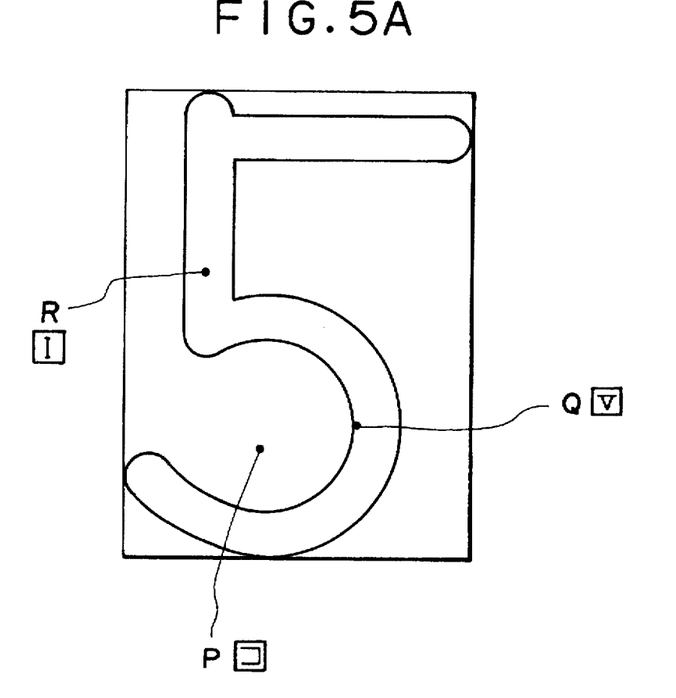
FIGS. 5A and 5B and 6 are diagrams showing an example of a feature extraction in the conventional technique.

FIG. 5A is a diagram showing an example of codes which have been given by such a process. In a white pixel P, when it is scanned in the upper, lower, right, and left directions, character lines exist in the upper, lower, and right directions, so that a code indicated by "]" is given. On the other hand, a black pixel Q corresponds to a point on an outline and a slope of the outline at this point is vertical, so that a code indicated by "V" is given. Since a point R corresponds to a point in the character line, a code indicated by "T" is given.

Figure 5B:
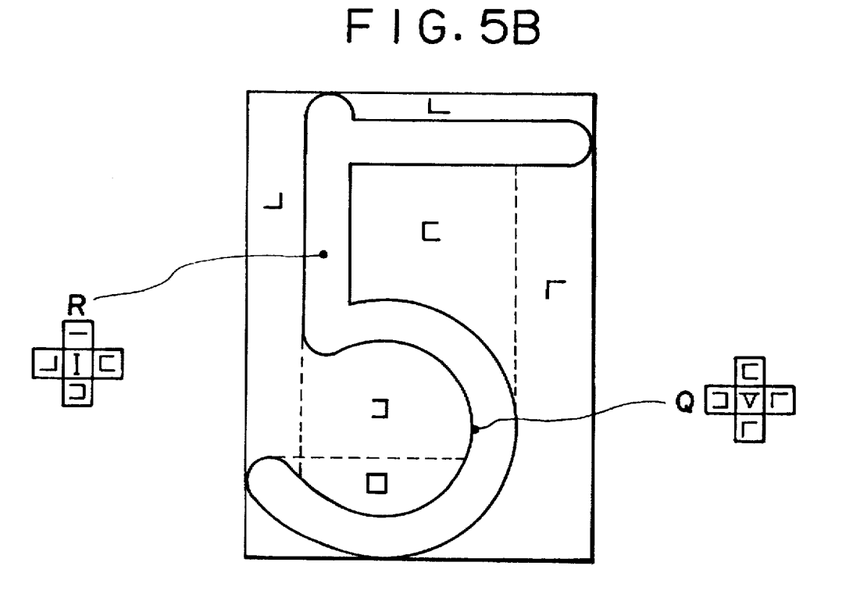

FIG. 5B is a diagram showing a state in which a high-order feature has been further added to the codes shown in FIG. 5A. The codes of the phases of the white pixels which are respectively closest in the upper, lower, right, and left directions from the black pixels Q and R are added to the original codes "V" and "T".

Codes are given to all of the pixels by the above procedure. By calculating the sum of the numbers of pixels for every code, a feature vector is extracted.

The first embodiment of the invention will now be described in detail hereinbelow.

Figure 1:
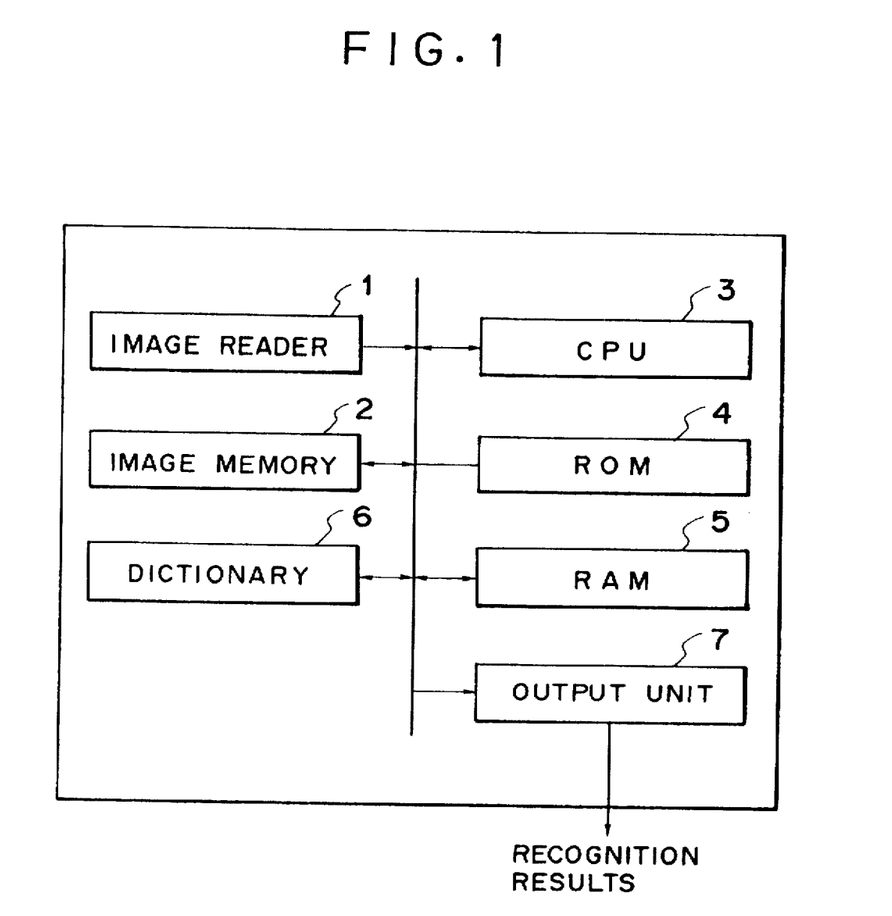
FIG. 1 is a block constructional diagram of an image processing apparatus of an embodiment.

FIG. 1 is a block constructional diagram of a character recognizing apparatus according to the embodiment.

In the diagram, reference numeral 1 denotes an image reader to read an original image; 2 an image memory to develop the read image; 3 a CPU to control the whole apparatus; 4 an ROM in which programs (flowchart shown in FIG. 4) regarding a process to cut out a character, a feature extracting process, and a character recognizing process which are executed by the CPU have been stored; 5 an RAM which is used as a work area of the CPU 3; 6 a dictionary which is referred when the character recognizing process is executed; and 7 an output unit to generate a result of the recognition. The embodiment will be explained with respect to a process to extract a feature of a character. Since the other cutting and recognizing processes are executed by the well-known procedure, their descriptions are omitted here.

Figure 2A:
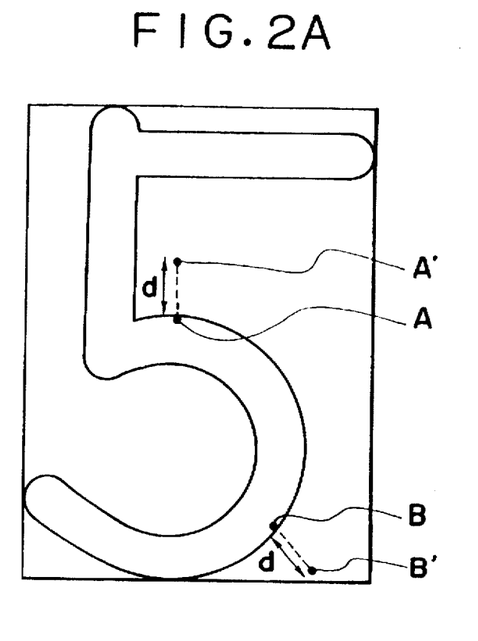
FIG. 2A is a diagram showing a part of a feature which is selected by a method of the embodiment.
Figure 3:
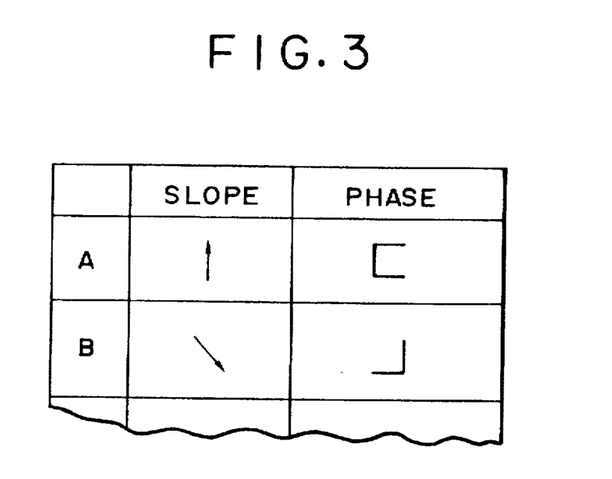
FIG. 3 is a diagram showing slopes and phases at points A and B in FIG. 2A.

FIG. 2A is a diagram showing a part of a feature which is extracted by the method of the embodiment. A and B shown in the diagram indicate examples of points whose features are extracted. In the invention, attention is paid to only the pixels corresponding to the outline points of a character among the black pixels and codes are given with respect to those points. For the points on the outline, a slope of the outline can be obtained by a conventional technique such as outline tracing method, method using a mask of 3×3, etc., or the like. In the embodiment, the slope of the outline is classified into eight directions by using 45° as a unit. FIG. 3 is a diagram showing slopes and phases at the points A and B in FIG. 2A. An arrow indicates the slope of the outline at each of the points A and B by a normal vector which is perpendicular to the outline. It is, however, assumed that the direction of the normal vector is set to a direction which directs from the inside of the character line to the outside.

Figure 2B:
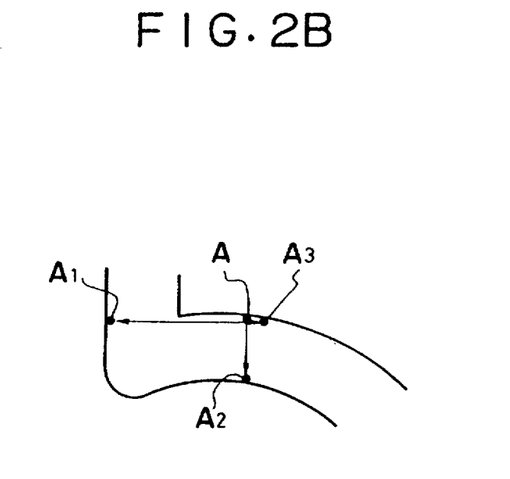
FIG. 2B is an enlarged diagram of a portion near a point A in FIG. 2A.

The phases of the white pixels as backgrounds of the character are fetched for the black pixels A and B. At this time, it is sufficient to pay attention to only the background in the direction which is in contact with the white pixels of the outline, namely, in the direction which is expressed by the normal vectors in FIG. 3. For instance, as will be obviously understood in an enlarged diagram of a portion near the point A shown in FIG. 2B, other points $A_1$, $A_2$, and $A_3$ of the outline exist in the directions other than the directions of the normal vectors when they are seen from the point A and features are also extracted at those points. Therefore, at the point A, there is no need to fetch the phases in the directions other than the directions of the normal vectors.

In the embodiment, accordingly, consideration is made for only the directions of the normal vectors from each of the points A and B. Further, in order to stably extract the phases for a deformation and noises of the character, phases of white pixels (points A' and B' shown in FIG. 2A) which are away from the points A and B by certain distances are fetched.

Such a white pixel is hereinafter referred to as a "complementary point" of the original black pixel.

A method of obtaining a complementary point will now be described with reference to FIG. 2A. At the point A, since the normal vector is directed upward, the point A' which is away from the point A upward by only a distance d is selected as a complementary point. The distance d is decided by a predetermined method by using a size of character as a parameter.

In the embodiment, the distance d is obtained by the following method. That is, assuming that a height of circumscribed rectangle of a character to be recognized is set to h and its width is set to w, the distance d is given by $$d = \gamma(h+w)$$

where, γ is a constant.

By the above equation, the distance d to the complementary point can be determined almost in proportion to the size of character. The feature extraction can be stably performed irrespective of the size of input character.

A method of obtaining phases of the complementary points A' and B' will now be described.

Figure 9:
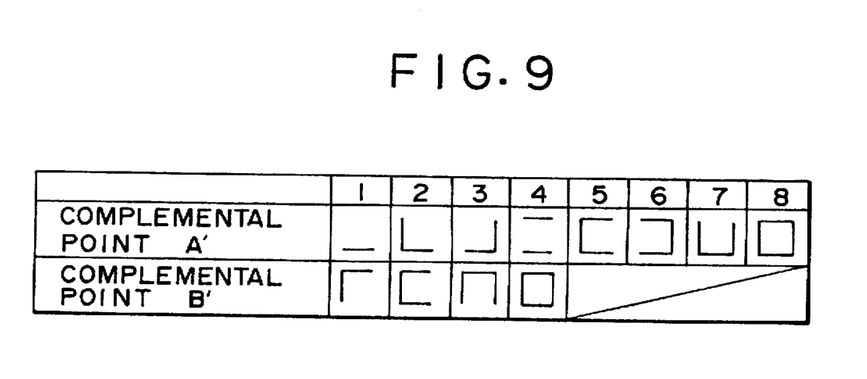
FIG. 9 is a diagram showing phases at complementary points A' and B' in the embodiment.

Since the normal vector at the point A is directed upward, a character line certainly exists in the down direction when it is seen from the complementary point A'. Accordingly, there is no need to consider the down direction when obtaining the phase at the complementary point A'. That is, as shown in the upper stage in FIG. 9, for the phase of the complementary point A', the presence or absence of the character line in each of the upper, right, and left directions is used as information and eight-dimensional ($=2^3$) feature vectors are extracted.

If the scanning line collides with a character line or a character frame until a point is away from the point A by only the distance d, a complementary point A' such that AA":AA'=1:α (α is a predetermined constant) is selected for such a collision point A".

Returning to FIG. 2A, at the point B, the normal vector is inclined. In such a case as well, the white pixel B' at a position which is away from the point B by only the distance d in the direction of the normal vector is selected as a complementary point. A method of obtaining the distance d and a procedure which is executed in the case where the scanning line collides with a character line or a character frame until the point is away from the point B by only the distance d are similar to those in the case of the point A mentioned above.

Since the point B exists in the left upper direction when it is seen from the complementary point B' of the point B, as a phase at the complementary point B', it is sufficient to merely check the presence or absence of the character lines in the right and down directions. In this case, as shown at the lower stage in FIG. 9, the presence or absence of the character lines in the down and right directions is used as information and four-dimensional ($=2^2$) feature vectors are extracted.

According to the above method, with respect to the black pixels on the outlines in four horizontal or vertical directions, feature vectors of the respective complementary points are concerned with $2^3$=eight dimensions, so that feature vectors in four directions (the slope of the outline relates to four directions of up, down, right and left) are concerned with (4×8)=32 dimensions. On the other hand, with respect to the black pixels on the oblique outline, vectors of the respective complementary points relate to $2^2$=four dimensions, so that vectors in four directions (four directions of the oblique right upper, right lower, left upper, and left down directions) are concerned with (4×4)=16 dimensions. Thus, feature vectors of total 48 (=32+16) dimensions are obtained.

Figure 4:
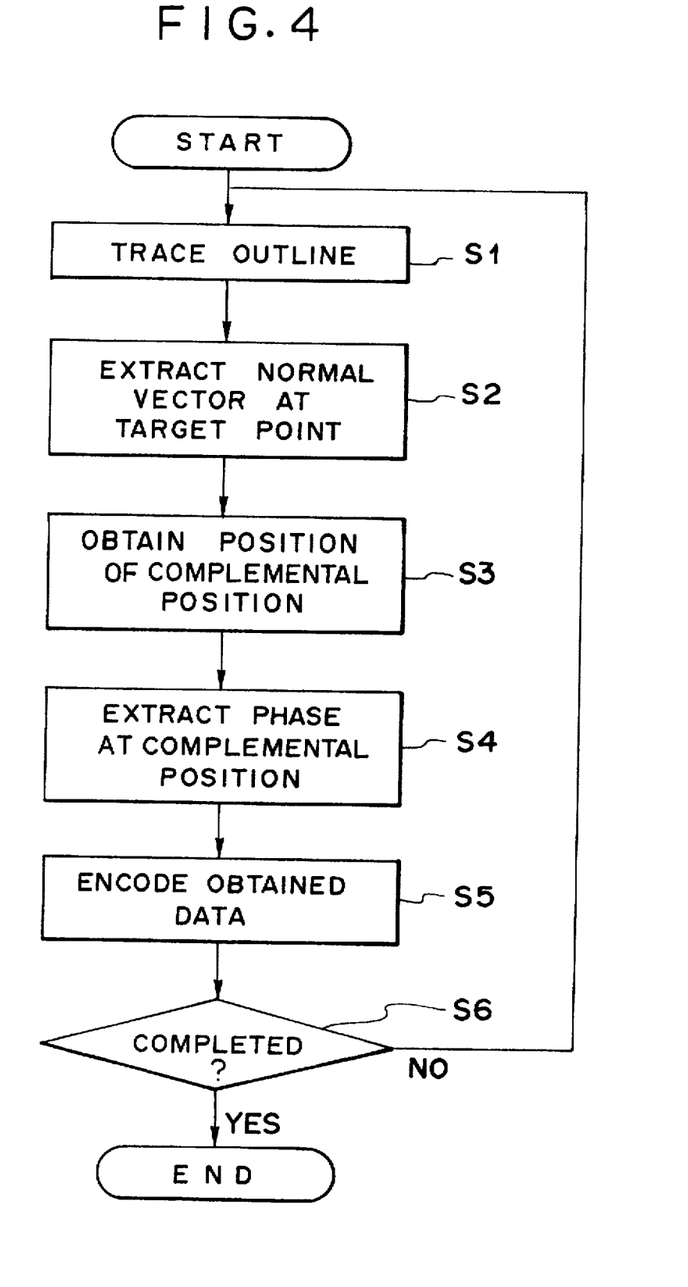
FIG. 4 is a flowchart according to a feature extraction in the embodiment.

On the basis of the above principle, the CPU 3 in the embodiment extracts features in accordance with a procedure shown in FIG. 4.

First, in step S1, an outline tracing process is executed and the coordinates of the black pixel point on the outline are obtained. In step S2, the normal vector for the target pixel derived is obtained. In the next step S3, the coordinates of the complementary point (white pixel which is away from the target pixel in the normal vector direction by only the distance d) for the target pixel are obtained. In step S4, a phase at the position of the complementary point based on whether the black pixel in the direction corresponding to the normal vector direction exists or not is obtained. In step S5, the coordinates position of the target pixel, the normal vector, and the phase data of the complementary point which have been derived as mentioned above are encoded and the resultant codes are stored, thereby obtaining the feature data of the target pixel data. After that, in step S6, a check is made to see if all of the data for the target character pattern has been obtained or not. If NO, the processing routine is returned to step S1 and the similar processes are executed hereinafter. After all of the data has been extracted, the processing routine advances from the feature extracting process to the next recognizing process.

<Second embodiment>

In the above first embodiment, the distance d to obtain the complementary point has been set to a constant value. However, the invention is not limited to such a fixed distance.

That is, there is a case where a ratio between the vertical and lateral dimensions of a character largely differs depending on the character font. Therefore, there is a case where it is preferable to change the value of d in accordance with the value of the normal vector.

Figure 7:
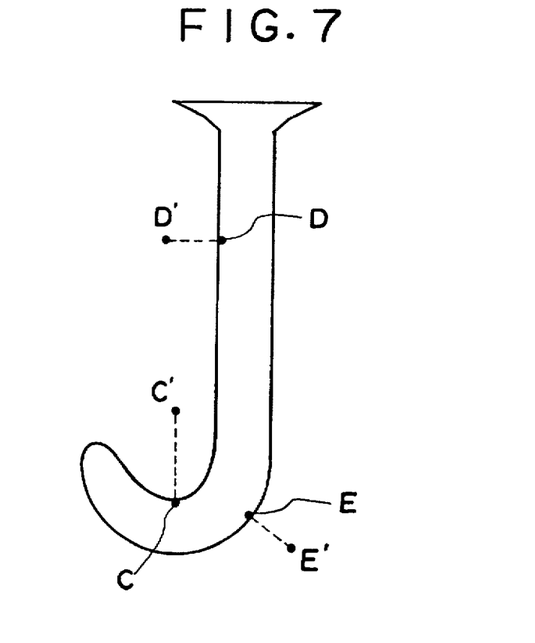
FIG. 7 is a diagram showing the concept of a feature extracting process according to the second embodiment.

In the case of an English character "J" shown in FIG. 7, a ratio between the lateral width and the vertical length of the character largely differs due to the inherent shape feature of the character. In such a case, for instance, at a point C in which the direction of the normal vector is the vertical direction, a distance $d_1$ to a complementary point C' is given by $$d_1 = \gamma_1 \cdot h$$

where, h denotes a height of a circumscribed rectangle of the character.

On the other hand, in the case of a point D such that the direction of the normal is the lateral (right/left) direction, a distance $d_2$ to a complementary point D' is given by $$d_2 = \gamma_2 \cdot w$$

where, w denotes a width of a circumscribed rectangle of the character.

On the other hand, in the case of a point E such that the direction of the normal vector is the oblique direction, a distance $d_3$ to a complementary point E' is given by $$d_3 = \gamma_3 (h+w)$$

where, $\gamma_1$, $\gamma_2$, and $\gamma_3$ are constants.

As mentioned above, by deciding the position of the complementary point in consideration of an inherent feature of the character shape, the phase data of the background is specialized, so that a more characteristic pattern can be recognized.

<Third embodiment>

Figure 8:
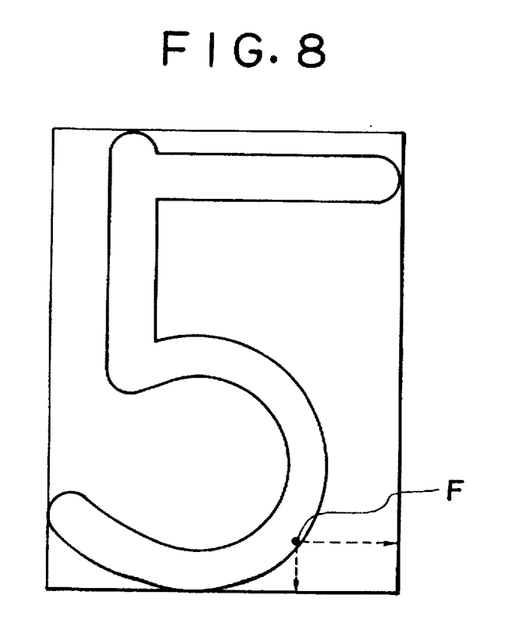
FIG. 8 is a diagram showing the concept of a feature extracting process according to the third embodiment.

With respect to the points on the oblique outline, the phase can be relatively stably extracted even in a portion near the black pixel, so that the phase of the background can be also fetched without providing any complementary point. FIG. 8 shows the third embodiment in such a case. The character image is directly scanned from a point F on the oblique outline in the right and down directions and the phase can be added to the point F in dependence on whether the scanning line collides with the character line or not.

Although the embodiment has been described with respect to the case where the character portion is expressed by black pixels and the background is expressed by white pixels, the invention is not limited to only the black and white pixels but any other colors can be also used. Although the phase extraction has been performed with respect to the pixels on the normal vector which is perpendicular to the outline for simplicity of explanation, there is no need to limit the pixels to the pixels on the normal vector. Further, in the feature extracting method according to the embodiment, an object to be recognized is not limited to a character but the feature extracting method can be also applied to the recognition of a general two-dimensional image.

As described above, according to the embodiment, in the character recognition to recognize a character by extracting a feature vector from a two-dimensional character image, a phase of a white pixel which is determined by a predetermined method in accordance with the slope at a point of a black pixel on the outline is given to the black pixel on the outline. Thus, it is possible to effectively extract a low-dimensional feature vector which is strong for a deformation of the character and noises and in which an amount of calculations is small. Therefore, a recognizing speed and a recognition ratio in the character recognizing process as a post process can be raised.

As described above, according to the invention, by stably extracting data included in the background of a character and by adding the resultant feature to the pixel in the outline portion, the stable feature extraction can be executed.

What is claimed is:

1. An image processing method comprising the steps of:
   extracting a slope at a first position on an outline of character image data;
   selecting a second position on a background of the character image data, the second position being separated from the first position by a predetermined distance in a direction normal to the extracted slope of the first position;
   extracting phase data at the second position, the extracted chase data being based on presence or absence of a portion of the character image data in a plurality of predetermined directions; and
   storing feature data of the character image data for the first position, the feature data comprising the phase data extracted at the second position and data indicating the first position.

2. A method according to claim 1, wherein the second position exists in the direction of a normal vector of the slope at the first position.

3. A method according to claim 1, wherein the second position is away from the first position by a predetermined distance.

4. A method according to claim 1, wherein the second position is away from the first position by a predetermined distance in the direction of a normal vector of the slope at the first position.

5. A method according to claim 1, wherein the phase data is data based on states of black pixels in a plurality of predetermined directions.

6. A method according to claim 3, wherein said predetermined distance depends on a size of the character data.

7. A method according to claim 4, wherein said predetermined distance depends on a size of the character data.

8. An image processing apparatus comprising:
   slope extracting means for extracting a slope at a first position on an outline of character image data;
   selecting means for selecting a second position on a background of the character image data, the second position being separated from the first position by a predetermined distance in a direction normal to the extracted slope or the first position;
   phase data extracting means for extracting phase data at the second position, the extracted phase data being based on presence or absence of a portion of the character image data in a plurality of predetermined directions; and
   memory means for storing feature data of the character image data for the first position, the feature data comprising the phase data extracted at the second position and data indicating the first position.

9. An apparatus according to claim 8, wherein the second position exists in the direction of a normal vector of the slope at the first position.

10. An apparatus according to claim 8, wherein the second position is away from the first position by a predetermined distance.

11. An apparatus according to claim 8, wherein the second position is away from the first position by a predetermined distance in the direction of a normal vector of the slope at the first position.

12. An apparatus according to claim 8, wherein the phase data which is extracted by the phase data extracting means is data based on stages of black pixels in a plurality of predetermined directions.

13. An apparatus according to claim 10, wherein the predetermined distance depends on a size of the character data.

14. An apparatus according to claim 11, wherein the predetermined distance depends on a size of the character data.

15. A method according to claim 1, further comprising the step of storing the slope of one first position extracted in said slope extracting step and the phase data extracted at the second position corresponding to the one first position in said phase data extracting step in correspondence with each other.

16. A method according to claim 5, wherein the plurality of predetermined directions are taken from the second position in accordance with the slope of the first position.

17. An apparatus according to claim 8, further comprising means for storing the slope of one first position extracted by said slope extracting means and the phase data extracted at the second position corresponding to the one first position by said phase data extracting means in correspondence with each other.

18. An apparatus according to claim 12, wherein the plurality of predetermined directions are taken from the second position in accordance with the slope of the first position.

19. An image processing method comprising the steps of:
   extracting a slope at a first position on an outline of character image data;
   determining a plurality of directions for scanning for character image data at a second position separated from the first position by a predetermined distance, the plurality of directions being determined in dependence on the slope extracted in said slope extracting step;
   scanning for a portion of the character image data in the plurality of directions determined in said determining step;
   determining phase data at the second position in response to a scanning result obtained in said scanning step; and
   storing feature data of the character image data for the first position, the feature data comprising the phase data determined in said determining step and data indicating the first position.

20. An image processing apparatus comprising:
   means for extracting a slope at a first position on an outline of character image data;
   means for determining a plurality of directions for scanning for character image data at a second position separated from the first position by a predetermined distance, the plurality of directions being determined in dependence on the slope extracted by said slope extracting means;
   means for scanning for a portion of the character image data in the plurality of directions determined by said determining means;
   means for determining phase data at the second position in response to a scanning result obtained by said scanning means; and
   storing feature data of the character image data for the first position, the feature data comprising the phase data determined in said determining step and data indicating the first position.

21. An image processing apparatus according to claim 8, further comprising an image reader for reading the image data.

22. An image processing apparatus according to claim 20, further comprising an image reader for reading the image data.

23. A computer-readable memory medium for storing computer-executable process steps for image processing, the computer-executable process steps comprising:
   a first extracting step for extracting a slope at a first position on an outline of character image data;
   a selecting step for selecting a second position on a background of the character image data, the second position being separated from the first position by a predetermined distance in a direction normal to the extracted slope of the first position;
   a second extracting step for extracting phase data at the second position, the extracted phase data being based on presence or absence of a portion of the character image data in a plurality of predetermined directions; and
   a storing step for storing feature data of the character image data for the first position, the feature data comprising the phase data extracted at the second position and data indicating the first position.

24. A computer-readable memory medium according to claim 23, wherein the second position exists in the direction of a normal vector of the slope at the first position.

25. A computer-readable memory medium according to claim 23, wherein the second position is away from the first position by a predetermined distance.

26. A computer-readable memory medium according to claim 23, wherein the second position is away from the first position by a predetermined distance in the direction of a normal vector of the slope at the first position.

27. A computer-readable memory medium according to claim 23, wherein the phase data is data based on states of black pixels which are in a plurality of predetermined directions away from a target pixel.

28. A computer-readable memory medium according to claim 25, wherein said predetermined distance depends on a size of the character data.

29. A computer-readable memory medium according to claim 26, wherein said predetermined distance depends on a size of the character data.

30. A computer-readable memory medium for storing computer-executable process steps for image processing, the computer-executable process steps comprising:
   an extracting step for extracting a slope at a first position on an outline of character image data;
   a first determining step for determining a plurality of directions for scanning for character image data at a second position separated from the first position by a predetermined distance, the plurality of directions being determined in dependence on the slope extracted in said slope extracting step;
   a scanning step for scanning for a portion of the character image data in the plurality of directions determined in said determining step;
   a second determining step for determining phase data at the second position in response to a scanning result obtained in said scanning step; and
   a storing step for storing feature data of the character image data for the first position, the feature data comprising the phase data determined in said determining step and data indicating the first position.

* * * * *

UNITED STATES PATENT AND TRADEMARK OFFICE
CERTIFICATE OF CORRECTION

PATENT NO. : 5,754,689

DATED : May 19, 1998

INVENTORS : TOHRU NIKI

It is certified that error appears in the above-identified patent and that said Letters Patent is hereby corrected as shown below:

On the title page, Item
[56] References Cited

OTHER PUBLICATIONS

"Apr. 69," should read --Apr. 1969--;
", Alphabets and Numerals," should be italicized.

COLUMN 5

Line 18, "normal" should read --normal vector--.

COLUMN 6

Line 14, "chase" should read --phase--.

Signed and Sealed this

Twenty-sixth Day of January, 1999

Attest:

*Attesting Officer*

*Acting Commissioner of Patents and Trademarks*